Jan. 16, 1962 P. B. HULTKRANS 3,017,302
ART OF PACKAGING COMMODITIES
Filed Jan. 31, 1958 2 Sheets-Sheet 1
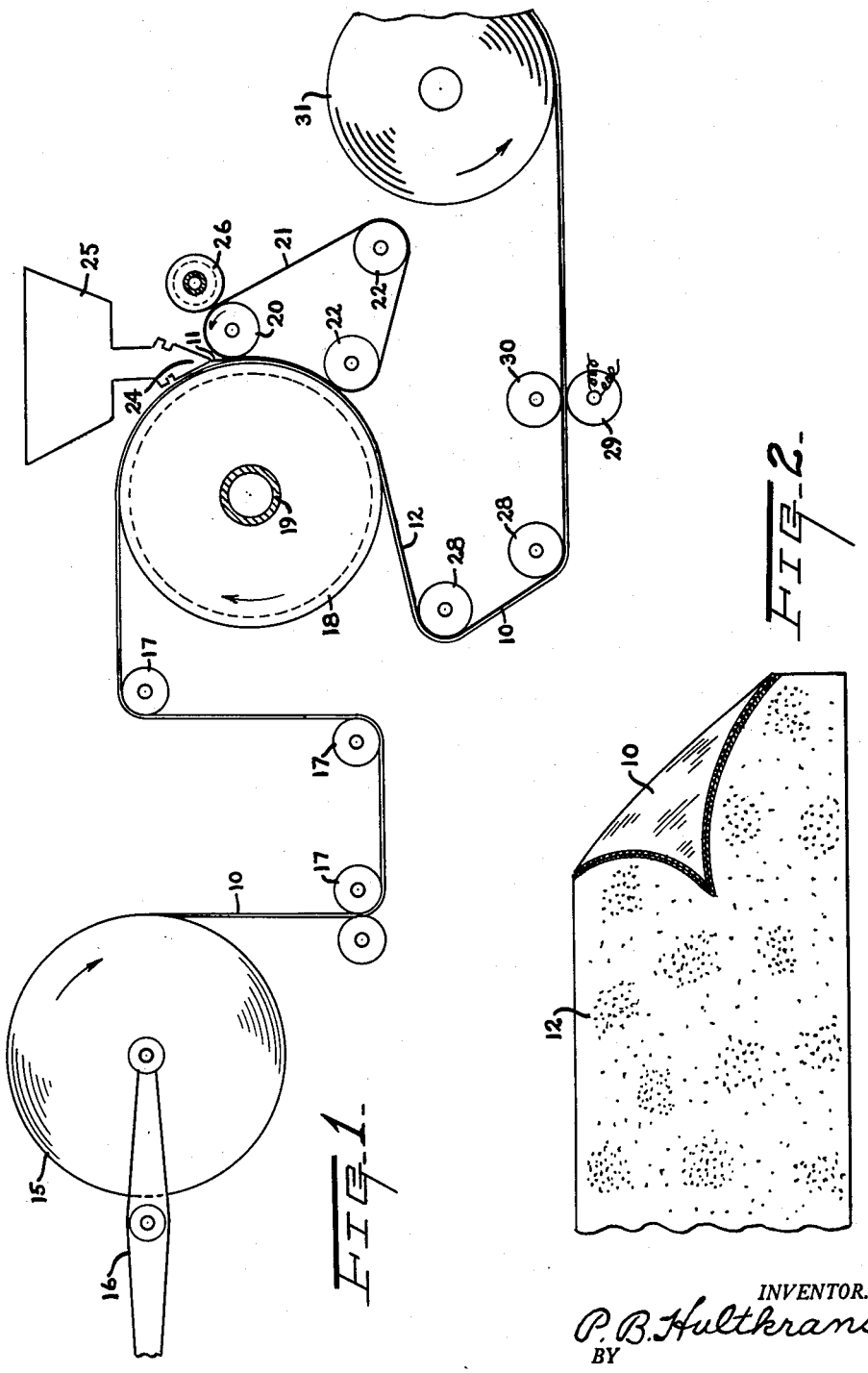
INVENTOR.
P. B. Hultkrans
BY
Lieber, Lieber & Nilles
ATTORNEYS.

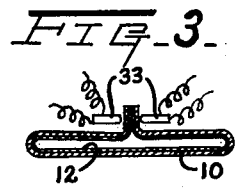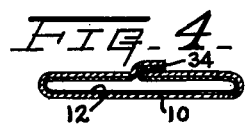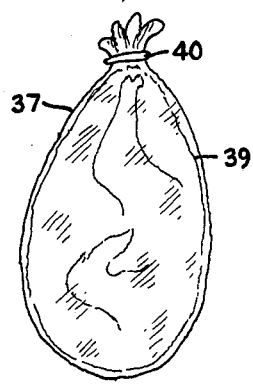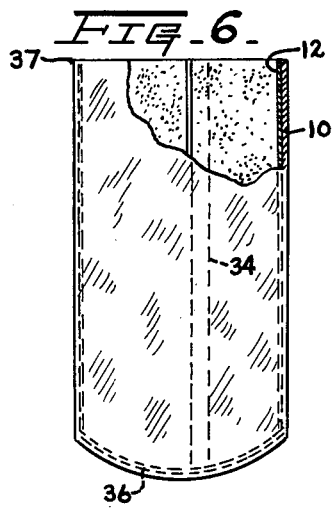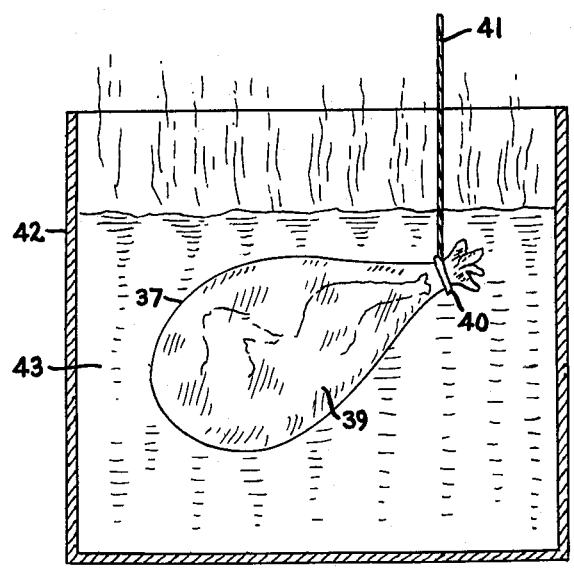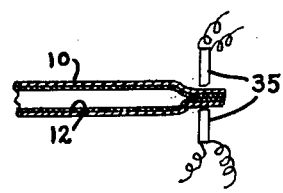

United States Patent Office 3,017,302
Patented Jan. 16, 1962

3,017,302
ART OF PACKAGING COMMODITIES
Paul B. Hultkrans, Milwaukee, Wis., assignor to Milprint, Inc., Milwaukee, Wis., a corporation of Delaware
Filed Jan. 31, 1958, Ser. No. 712,367
5 Claims. (Cl. 154—43)

The present invention relates generally to improvements in the art of packaging commodities in flexible containers, and relates more particularly to the provision of an improved commodity wrapper and to the production and use thereof.

A primary object of the invention is to provide improvements in composite heat shrinkable wrappers which are exceptionally strong and durable under diverse conditions and which are moreover capable of being readily fabricated and sealed by means of heat.

It has heretofore been proposed, particularly in the packaging of certain irregularly shaped commodities such as meat cuts and fowl, to utilize heat shrinkable plastic films in order to obtain a tightly conforming wrapper in the final package assembly. In such cases, a plastic film is first selected which has been rendered heat shrinkable as by stretch orientation. One such material is commercially available under the trade-name of "Cry-O-Vac," but other stretch-oriented and heat shrinkable films are also used. The selected film is then commonly fabricated into a bag or pouch-like container of sufficient size and shape to readily receive the commodity to be packaged. After the commodity has been enclosed within the container and the air evacuated therefrom, heat is supplied to the package in a suitable manner to shrink the film into snug contact with the packaged product.

While this method has enjoyed considerable commercial success, the plastic films previously available for use in the method have not been entirely satisfactory. For example, some of the commercially available films which have been rendered heat shrinkable by stretch orientation, as by a cold stretching operation, are objectionably deficient in strength, and durability, especially under varying atmospheric and temperature conditions such as frozen food storage temperatures. Other plastic films capable of being made heat shrinkable by stretch orientation, such as certain heat shrinkable polyester films, possessing desirable clarity and excellent strength, durability and stability characteristics under widely varying temperature conditions are, on the other hand, difficult to fabricate into bags or pouches due to the poor heat sealing properties thereof and are therefore objectionable for use in the heat shrinking method above described.

It is accordingly a more specific object of this invention to provide an improved composite commodity wrapper which is heat shrinkable and which obviates the disadvantages and objections heretofore attendant wrapper sheets utilized in heat shrinking packaging operations.

Another specific object of the invention is to provide an improved heat shrinkable wrapper which is exceedingly strong, durable and scuff resistant, which possesses high tensile strength, which has good clarity and transparency, which is water repellant and has good moisture protective properties, and which is moreover readily heat sealable and capable of being easily fabricated into protective commodity containers.

Another specific object of my invention is to provide an improved heat shrinkable composite commodity wrapper which is exceptionally stable and retains its desirable qualities and characteristics under widely varying atmospheric and temperature conditions for long periods of time.

Another specific object of this invention is to provide an improved commodity wrapper which combines a heat-shrinkable film and a non-shrinkable film in a manner wherein the non-shrinkable film is carried along with the shrinkable film when subjected to heat, thereby causing shrinkage of the composite wrapper.

Still another specific object of the invention is to provide an improved heat shrankable wrapper consisting essentially of a stretch oriented heat shrinkable polyester film coated or covered with an adhering layer of inherently thermoplastic material having a somewhat lower melting point than the base film.

An additional specific object of the present invention is to provide an improved method of producing such composite heat shrinkable wrappers by extrusion coating or lamination.

These and other specific objects and advantages of the invention will become apparent from the following detailed description.

A clear conception of the features constituting the present improvements and of the steps involved in the improved wrapper production method and mode of use of the wrapper may be had by referring to the drawings accompanying and forming a part of this specification wherein like reference characters designate the same or similar parts in the several views.

FIG. 1 is a diagrammatic view illustrating the improved method and typical apparatus for exploiting the same in extrusion coating a heat shrinkable film;

FIG. 2 is a plan view of a fragment of the coated or composite film with a corner portion thereof turned over to show the opposite side;

FIG. 3 is a transverse section through the composite wrapper sheet after formation into a flat tube and showing the longitudinal side seam being formed by heat sealing;

FIG. 4 is a similar transverse section through the flat tube after formation of the longitudinal seal and with the side seam folded against the adjacent side wall;

FIG. 5 is a longitudinal section through a fragment of the flat tube showing one of the transverse bottom seals being effected by means of heat;

FIG. 6 is a plan view of a pouch-like container fabricated from the composite film, part of the side wall being broken away for clarity;

FIG. 7 is a side view of a fowl loosely packaged in one of the composite wrappers prior to the heat shrinking thereof; and FIG. 8 is a section through a hot water tank showing the package immersed in the hot bath for the purpose of heat shrinking the wrapper.

While the invention has been shown and described herein as being embodied in a pouch-like container formed of a particular polyester film commercially available under the trade-name "Mylar" having an extrusion coating of polyethylene and adapted for use in the packaging of fowl, it is not desired or intended to thereby unnecessarily limit or restrict the invention since various other combinations of materials having the required physical characteristics may be used to advantage in the packaging of diverse commodities. It is also contemplated that certain descriptive terms used herein shall be given the broadest possible interpretation consistent with the disclosure; and the term "composite wrapper" is intended to cover all forms of flexible packaging sheets or containers adapted to protectively enclose a desired commodity and composed of more than one ply of material whether coated or adhered by adhesive to each other while the term "laminated" is likewise intended to cover coated sheets as well as those joined or secured over substantially their entire adjoining surfaces by adhesive or otherwise.

In accordance with the present invention, a flexible polyester film, such as the polyethylene terephthalate resin film "Mylar," which has been stretch oriented to render the same heat shrinkable and characterized by its extreme durability; scuff-resistance; outstanding strength;

good clarity, transparency and gloss; high tensile strength; moisture resistance; chemical inertness; and inherent thermal stability is first selected. Likewise, an inherently thermoplastic material, such as polyethylene, having a relatively low melting point and characterized by its good heat sealability; flexibility and pliability even at frozen food temperatures; excellent moistureproofness; resistance to chemicals; transparency when properly applied; lack of odor, taste and toxicity; and ability to retain its physical properties independently of moisture conditions is selected. The materials thus selected are then combined in a suitable manner either by adhesive union of independent sheets or by extrusion coating of the polyethylene directly on the polyester film to thereby provide a composite sheet. For reasons of economy, it is preferred to form the composite sheet by extrusion coating or laminating the polyethylene on the base film, but a special technique is required in exploiting such method in order to avoid premature shrinkage of the base film and loss of stretch orientation when the film is contacted by the hot polyethylene extruded thereon. The method of producing the composite heat shrinkable wrapper material accordingly constitutes one aspect of this invention.

Referring particularly to FIG. 1 of the drawings, the steps of the improved extrusion coating method are essentially as follows. A web 10 of the polyester film selected as the base sheet and stretch oriented in a known manner to render the same heat shrinkable is initially advanced past the nip and between adjacent opposed cooperating arcuate surfaces. As the web 10 enters the nip and advances between the arcuate surfaces, a curtain 11 of the selected heat sealable inherently thermoplastic material in hot flowable condition is extruded into the nip formed between the opposed arcuate surfaces. Then, as the arcuate surfaces are advanced, the curtain 11 of thermoplastic material is drawn from the source of feed or extrusion onto the base film 10 toward and between the arcuate surfaces as a uniform coating or laminae on the base film. As the hot extruded material contacts the base sheet 10, the base sheet is simultaneously cooled thus avoiding possible destruction of the stretch orientation and premature shrinkage of the base film 10, the cooling being accomplished by chilling the arcuate surface immediately adjacent to the uncoated side of the base film. To insure solidification and stabilization of the coating 12 while avoiding excessive heating and consequent shrinkage of the base film 10, the advancement of the composite or coated web is continued about the cooled arcuate surface with the base film maintained in intimate contact therewith. Finally, the composite sheet is withdrawn from the cooled arcuate surface, and the composite web may then be wound in an obvious manner for subsequent use.

In exploiting the improved method, the web 10 of the heat shrinkable polyester film is withdrawn in a suitable manner from a supply roll 15 carried on a spindle reel 16 and is advanced about a series of guide rolls 17 to the periphery of a rotatable hollow steel cylinder or drum 18. The cylinder 18 is cooled by constantly circulating cooling liquid through the hollow shaft 19 and interiorly of the cylinder in a well known manner, and cooperating with the cylinder 18 to provide opposed arcuate surfaces is a rotatable back-up or pressure roll 20. The back-up roll 20 may be used either alone or with a flexible belt 21 as shown, the belt 21 being driven with the roll 20 and guided about the rollers 22. When used alone, the roll 20 should be surfaced with a release material such as silicone rubber and preferably constantly moistened with silicone oil or the like to avoid sticking thereto of the material fed as a curtain 11 from the die 24 of the extruder 25 to the nip formed between the peripheries of the cylinder 18 and roll 20; and it is also preferable in any event to surface cool either the roll 20 or the belt 21 by running it in contact with a cooling cylinder 26 or the like which is hollow and interiorly cooled by circulating liquid to facilitate release. As the curtain 11 of hot flowable thermoplastic material is fed in regulated quantity from the extrusion die 24 to the nip, the cylinder 18 and roll 20 together with the belt 21 are driven in opposite directions in synchronism and at a speed dependent upon the rate of feed of the thermoplastic material from the die to thereby draw the curtain 11 toward the nip onto the surface of the base film 10 and between the peripheries of the cylinder 18 and back-up roll 20. As the composite coated web advances it is maintained in intimate contact with the periphery of the cooled cylinder 18 by the backing belt 21 from which it readily releases, and from the cylinder 18, the composite web is advanced about suitable guide rolls 28 and between cooperating rollers 29, 30, to the roll 31, the composite web consisting of a stretch oriented heat shrinkable polyester base film 10 having a layer or coating 12 of heat sealable inherently thermoplastic material adhered thereto as shown in FIG. 2.

The composite web may then be readily folded into tubular formation with the base film 10 exteriorly exposed and the coating 12 on the interior. The edge portions are then brought into juxtaposition with the coating in face-to-face relation, and heat and pressure are applied thereto with the aid of suitable heat sealing members 33 as shown in FIG. 3. Then, the fin type seal 34 thus formed may be folded against the adjacent wall as in FIG. 4, and the tube is severed into sections of the desired length. These sections may thereafter be formed into bags or pouches 37, as shown in FIG. 6, by merely transversely heat sealing one end of each section as at 36 with the aid of heat sealing members 35 as in FIG. 5. However, since the heat applied to effect the longitudinal and transverse seals 34, 36 respectively tends to cause shrinkage of the stretch oriented polyester film 10, it is desirable to use a sealing heat of relatively low temperature applied for a long dwell period thus allowing the film to relax and relieve the shrinkage tension.

It has been found that heat shrinkable polyester films selected as hereinabove indicated and combined with a heat sealable inherently thermoplastic material having the characteristics specified rather unexpectedly retains practically all of its orientation and heat shrinkable properties. It has also been discovered that when the stretch oriented base film is shrunk by subjecting the same to heat, the heat sealable ply is carried with the base film so that no delamination, wrinkling or puckering of the composite sheet occurs. Accordingly, bags, pouches or other wrappers formed from the improved composite sheet are exceedingly useful in producing packages in which the wrapper in the final package assembly is in close conformity to the packaged product, it being only necessary to enclose the commodity in a relatively loose fitting wrapper, remove the air before sealing the wrapper sheet, and then subjecting the wrapper assemblage to heat. This is illustrated in FIGS. 7 and 8 showing, in FIG. 7, the dressed carcass 39 of a fowl inserted into a loose fitting pounch-like container 37 from which the air has been evacuated in a suitable known manner and which is then closed at its mouth portion as by a band or suitable closure tie or clip 40. Thereafter, the package assembly may be suspended as by a string or cord 41 into a suitable tank 42 of boiling water 43, as shown in FIG. 8, to effect shrinkage of the wrapper into snug conformity with the fowl 39.

The wrapper thus applied develops and retains good clarity to present a sparkling and attractive appearance and may subsequently be frozen to preserve the product. Tests show that the polyester film forming the outer exposed covering gives excellent resistance to scuffing and fracturing while the inner thermoplastic coating makes good contact with the surface of the enwrapped commodity and contributes desirable moistureproofness to prevent desiccation of the fowl during storage. It is important that the polyester resin comprising the base film which is externally exposed in the final package be selected for its durability, strength, scuff-resistance and chemical inertness, and it must furthermore be stretch oriented in a suitable known manner to render the same heat shrinkable. When the heat shrinkable base film is combined with the non-heat shrinkable inner ply as herein described, it has been discovered that a rather unexpected phenomenon occurs upon subjecting the resultant composite wrapper to heat, namely, the heat shrinkable ply carries with it the normally non-heat shrinkable ply and a snug-fitting final wrapper results when packaging commodities therein. As for the coating or inner ply of the composite wrapper, it should be moisture resistant, pliable, tasteless, odorless and non-toxic, and above all, it must have a low melting point relative to that of the base film so as to render the same readily heat sealable at temperatures which do not materially affect the orientation and heat shrinkable properties of the base film—it having been found that a temperature range of 100° F. or greater between the melting point of the base resin and the coating gives satisfactory results. In fabricating the wrapper, the polyester base film may be selected from one having a melting point of between 450° F. and 500° F. while the inherently thermoplastic ply adhered thereto should have a melting point of between 200° F. and 400° F. In addition, it should be noted that if the heat sealable thermoplastic inner ply is to be coated on the base film as by the extrusion method described herein, the coating material should be selected from one which has an affinity for the polyester base film, but this is, of course, not an important consideration if the plies are laminated by means of a suitable separate adhesive.

The following are a few specific examples of typical embodiments of the invention.

*Example 1.*—A base sheet of stretch oriented polyester resin film was provided having a thickness of .0005 inch and a linear shrinkage of approximately 30% in both axes of the sheet at a temperature of 210° F. One side of this sheet was extrusion coated with polyethylene in a thickness of .001 inch by means of a slot die extruder delivering into a combining nip. The polyester resin sheet was brought into the nip in contact with the cooled roller. The hot polyethylene was held in contact with the polyester base sheet by means of a belt to increase cooling contact. The laminated sheet was then formed into a side seamed, round bottom pouch by suitably shaped sealing jaws using a temperature of 250° F. with a dwell time of one second and a pressure of 30 pounds per square inch. This 10" x 16" pouch was stuffed with a 12 pound dressed turkey. The pouch was then gathered at the open end over a inserted vacuum nozzle, the air was evacuated to collapse the pouch around the turkey, then the gathered neck of the bag was twisted as the nozzle was removed and the gathered closure was held in place by application of a metal clip. The package was then immersed in water at 210° F. for one second. This caused the laminated pouch to shrink, with removal of wrinkles, and give a transparent, closely adherent covering over all parts of the turkey. The completed package was then frozen at −20° F. ready for storage and marketing.

*Example 2.*—A base sheet of stretch oriented polyester resin film was provided having a thickness of .0005 inch and a linear shrinkage of approximately 30% in both axes of the sheet at a temperature of 210° F. One side of this sheet was extrusion coated with polypropylene in a thickness of .001 inch by means of a slot die extruder delivering into a combining nip. The polyester resin sheet was brought into the nip in contact with the cooled roller. The hot polypropylene was held in contact with the polyester base sheet by means of a belt to increase cooling contact. The laminated sheet was then formed into a side seamed, round bottom pouch by suitably shaped sealing jaws using a temperature of 400° F. with a dwell time of one second and a pressure of 30 pounds per square inch. This 10" x 16" pouch was stuffed with a 12 pound dressed turkey. The pouch was then gathered at the open end over an inserted vacuum nozzle, the air was evacuated to collapse the pouch around the turkey, then the gathered neck of the bag was twisted as the nozzle was removed and the gathered closure was held in place by application of a metal clip. The package was then immersed in water at 210° F. for one second. This caused the laminated pouch to shrink, with removal of wrinkles, and give a transparent, closely adherent covering over all parts of the turkey. The completed package was then frozen at −20° F. ready for storage and marketing.

*Example 3.*—A base sheet of stretch oriented "nylon" polyamid resin film was provided having a thickness of .001 inch and a linear shrinkage of approximately 30% in both axes of the sheet at a temperature of 210° F. One side of this sheet was extrusion coated with polyethylene in a thickness of .001 inch by means of a slot die extruder delivering into a combining nip. The polyamid resin sheet was brought into the nip in contact with the cooled roller. The hot polyethylene was held in contact with the polyamid base sheet by means of a belt to increase cooling contact. The laminated sheet was then formed into a side seamed, round bottom pouch by suitably shaped sealing jaws using a temperature of 250° F. with a dwell time of one second and a pressure of 30 pounds per square inch. This 10" x 16" pouch was stuffed with a 12 pound dressed turkey. The pouch was then gathered at the open end over an inserted vacuum nozzle, the air was evacuated to collapse the pouch around the turkey, then the gathered neck of the bag was twisted as the nozzle was removed and the gathered closure was held in place by application of a metal clip. The package was then immersed in water at 210° F. for one second. This caused the laminated pouch to shrink, with removal of wrinkles, and give a transparent, closely adherent covering over all parts of the turkey. The completed package was then frozen at −20° F. ready for storage and marketing.

It is not desired or intended to limit this invention to precise combination of materials used in the improved composite wrapper or to the exact steps of the method herein shown and described for producing the same since various modifications within the scope of the appended claims may occur to persons skilled in the art to which this invention pertains.

I claim:

1. A commodity wrapper comprising, a ply of flexible polyester film which has been stretch-oriented to render the same heat-shrinkable at a temperature of substantially 210° F., and a ply of flexible and readily heat-sealable inherently weaker thermoplastic material having a lower melting point than said polyester film adhered thereto over substantially its entire surface to provide a composite heat-shrinkable wrapper sheet having a readily heat-sealable surface.

2. A commodity wrapper comprising, a ply of flexible polyester film which has been stretch-oriented to render the same heat-shrinkable at a temperature of substantially 210° F., and a ply of flexible and readily heat-sealable inherently weaker thermoplastic material having a melting point at least 100° F. lower than said polyester film adhered thereto over substantially its entire surface to provide a composite heat-shrinkable wrapper sheet having a readily heat-sealable surface.

3. A commodity wrapper comprising, a ply of flexible polyester film which has been stretch-oriented to render the same heat-shrinkable at a temperature of substantially 210° F., said polyester film having a melting point of between 450° F. and 500° F., and a ply of flexible and readily heat-sealable inherently weaker thermoplastic material having a melting point of between 200° F. and 400° F. adhered to said polyester film over substantially is entire surface to provide a composite heat-shrinkable wrapper sheet having a readily heat-sealable surface.

4. A commodity wrapper comprising, a base ply of flexible polyethylene terephthalate resin which has been stretch-oriented to render the same heat-shrinkable at a temperature of substantially 210° F., and a ply of flexible and readily heat-sealable inherently thermoplastic polyethylene material having a lower melting point than said base ply adhered thereto over substantially its entire surface to provide a composite heat-shrinkable wrapper sheet having a readily heat-sealable surface.

5. A commodity receiving container comprising, a base ply of flexible polyester film which has been stretch-oriented to render the same heat-shrinkable at a temperature of substantially 210° F., and a ply of flexible and readily heat-sealable inherently weaker thermoplastic material having a lower melting point than said polyester film adhered thereto over substantially its entire surface to provide a composite heat-shrinkable sheet having a readily heat-sealable surface, said composite sheet being folded to tubular formation with said heat-sealable ply disposed interiorly thereof and sealed in face-to-face relation by heat.

References Cited in the file of this patent

UNITED STATES PATENTS

| | | |
|---|---|---|
| 2,434,541 | Bierer | Jan. 13, 1948 |
| 2,594,229 | Snyder et al. | Apr. 22, 1952 |
| 2,607,712 | Sturken | Aug. 19, 1952 |
| 2,683,894 | Kritchever | July 20, 1954 |
| 2,686,744 | Cornwell | Aug. 17, 1954 |
| 2,714,571 | Irion | Aug. 2, 1955 |
| 2,801,180 | Rumsey | July 30, 1957 |
| 2,828,799 | Harrison | Apr. 1, 1958 |
| 2,865,765 | Allen | Dec. 23, 1958 |

FOREIGN PATENTS

| | | |
|---|---|---|
| 783,457 | Great Britain | Sept. 25, 1957 |

OTHER REFERENCES

Food Engineering, May 1956, pages 69 and 156.